US006533944B1

(12) United States Patent
Rohr

(10) Patent No.: US 6,533,944 B1

(45) **Date of Patent: *Mar. 18, 2003**

(54) METHOD AND DEVICE FOR RECOVERING FINE SAND FROM A FLOATING DREDGER

(76) Inventor: Wolfgang Rohr, Mörschstrasse 57a, D-67165 Waldsee (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/480,592

(22) Filed: Jan. 7, 2000

(30) Foreign Application Priority Data

Jan. 7, 1999 (DE) ........................................ 199 00 279

(51) Int. Cl.[7] ................................................ B01D 33/04

(52) U.S. Cl. ........................ 210/747; 210/768; 210/783; 210/804; 210/170; 210/241; 210/251; 210/400; 37/340; 209/428

(58) Field of Search ................................ 210/747, 170, 210/400, 780, 783, 768, 800, 804, 241, 251; 209/428–433, 920; 37/338, 340

(56) References Cited

U.S. PATENT DOCUMENTS

| | | | | | |
|---|---|---|---|---|---|
| 4,052,299 | A | * | 10/1977 | Rohr | 209/430 |
| 4,265,036 | A | * | 5/1981 | Staats | 37/71 |
| 4,804,095 | A | * | 2/1989 | Rohr et al. | 37/71 |
| 4,968,418 | A | * | 11/1990 | Rohr | 209/430 |
| 5,150,986 | A | * | 9/1992 | Rohr | 405/223 |
| 5,179,793 | A | * | 1/1993 | Rohr | 37/71 |
| 5,259,130 | A | * | 11/1993 | Rohr | 37/338 |
| 5,447,372 | A | | 9/1995 | Araki et al. | |
| RE35,559 | E | | 7/1997 | Lagreca | |
| 5,735,062 | A | | 4/1998 | Sukup | |
| 6,044,979 | A | | 4/2000 | Rohr et al. | 209/430 |
| 6,059,120 | A | * | 5/2000 | Rohr et al. | 209/430 |
| 6,134,815 | A | * | 10/2000 | Rohr | 37/308 |

FOREIGN PATENT DOCUMENTS

| | | |
|---|---|---|
| DE | 75 41 007 | 8/1976 |

OTHER PUBLICATIONS

Dr.–Ing. Richard Ernst, *Dictionary of Engineering and Technology, Vol. I German–English,* Oscar Brandstetter Verlag—Wiesbadenk, Copyright page and p. 148.

*The American Heritage Dictionary of the English Language,* Copyright page and p. 473.

* cited by examiner

*Primary Examiner*—Robert J. Popovics

(57) ABSTRACT

The method relates to the recovery of fine sand on floating production equipment in the form of a floating grab-bucket type excavator or floating bucket chain dredger. In this case, the dredged material is dewatered and transported to shore via floating conveyor belts. The dredged material is transferred to dewatering screening machine having a dewatering deck with a dewatering coating. Below the dewatering deck the screening machine has a blind bottom covering the entire surface area, whereby in the direction of conveyance the end zone is provided with a discharge. The discharge is directed at a hydro belt separator, which has a revolving endless conveyor belt with a washing trough as the separation bed, and an ascending part leading away from the washing trough. The running direction of the conveyor belt is in the direction of the ascent, whereby the dredged material is transferred at the discharge of the screening machine to the washing trough of the hydro belt separator.

4 Claims, 2 Drawing Sheets

METHOD AND DEVICE FOR RECOVERING FINE SAND FROM A FLOATING DREDGER

BACKGROUND OF THE INVENTION

1. Field of the Invention

The invention relates to a method for recovering fine sand from equipment in the form of a floating grab-bucket conveyor or floating bucket chain dredging craft, whereby the dredged material is dewatered and conveyed to shore via floating conveyor belts.

In addition, the invention relates to a device for carrying out the method, by which the dredged material can be transferred to a dewatering screening machine with a material conveyor and floating belt arranged downstream, whereby the screening machine has a dewatering deck with a dewatering coating.

2. Description of the Prior Art

This floating equipment, which includes a bucket chain excavator or floating grab-bucket dredger, collects gravel under water and transports it to shore via floating conveyor belts. This gravel material must be dewatered before it is transported with conveyor belts. Therefore, dewatering is accomplished with a horizontal dewatering screen, on floating dredgers and floating bucket chain excavators. The dewatering screen is installed so that there is as little lifting height as necessary for the floating dredger, and as little conveyance height as possible is required for the bucket chain. Thus, the dewatering screen has to be built as low as possible. The material that is dewatered is transferred from the dewatering screen via a chute to the conveyor belt line transporting the material to shore.

Due to the dewatering slots, fine sand is lost together with the water in the dewatering process. This fine sand is returned to the water being dredged. Rather than return the fine sand, it can be recovered. A screening tub is employed for this purpose for collecting the material draining off. This screening tub is required because of the mandatory installation of the dewatering screen. This screening tub is provided with a pump, which pumps the material into a cyclone for the recovery. When sand is present in small amounts, the cyclone may selectively transfer the sand to the same dewatering machine, or if much fine sand is lost, it can transfer it to a second screen for transport to the conveyor belts.

The significant drawback of this method, which is known, from German design patent DE-GM 75 41 007, is that the energy consumption is increased by a solid pump employed for pumping the sand-and-water mixture into the cyclones with the required pressure. The device is characterized by high mechanical wear and high weight, which has a negative effect on the floating unit, and which requires high investment costs.

Therefore, it would be desirable to provide a method or device that reduces the energy requirement, weight and wear costs of the device.

SUMMARY OF THE INVENTION

The problems of the prior art are solved by installing a blind bottom below the dewatering screen of a screening machine. This blind bottom collects the water/fine sand mixture, discharges it into the conveyor device, and loads it in a washing trough acting as the separation bed of a hydro belt separator.

This blind bottom is located under the dewatering deck, and covers the entire surface area. In this case, the end zone viewed in the direction of conveyance has a discharge that is directed at a hydro belt separator consisting of a revolving endless conveyor belt with a washing trough acting as the separation bed, and an ascending part leading away from the washing trough. Thus, the conveyor belt runs in the direction of the ascent so that at the discharge of the screening machine, the dredged material is transferred to the washing trough of the hydro belt separator.

In an advantageous embodiment, the dewatering deck is designed as a classifying deck. This makes it possible to separate the complete sand fraction of, e.g. 0.2 mm, and to separate on the floating dredger the component of finest sand as well as organic components. In addition, there is a dewatering screen that is arranged below the ascending part of the conveyor belt. Furthermore, a return line runs from the dewatering screen to the hydro belt separator. Finally, there is also a filter that is arranged against the overflow of the separation bed.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings wherein similar reference characters denote similar elements throughout the several views.

DETAILED DESCRIPTION OF THE PREFERRED EMBODIMENT

Figure 1:
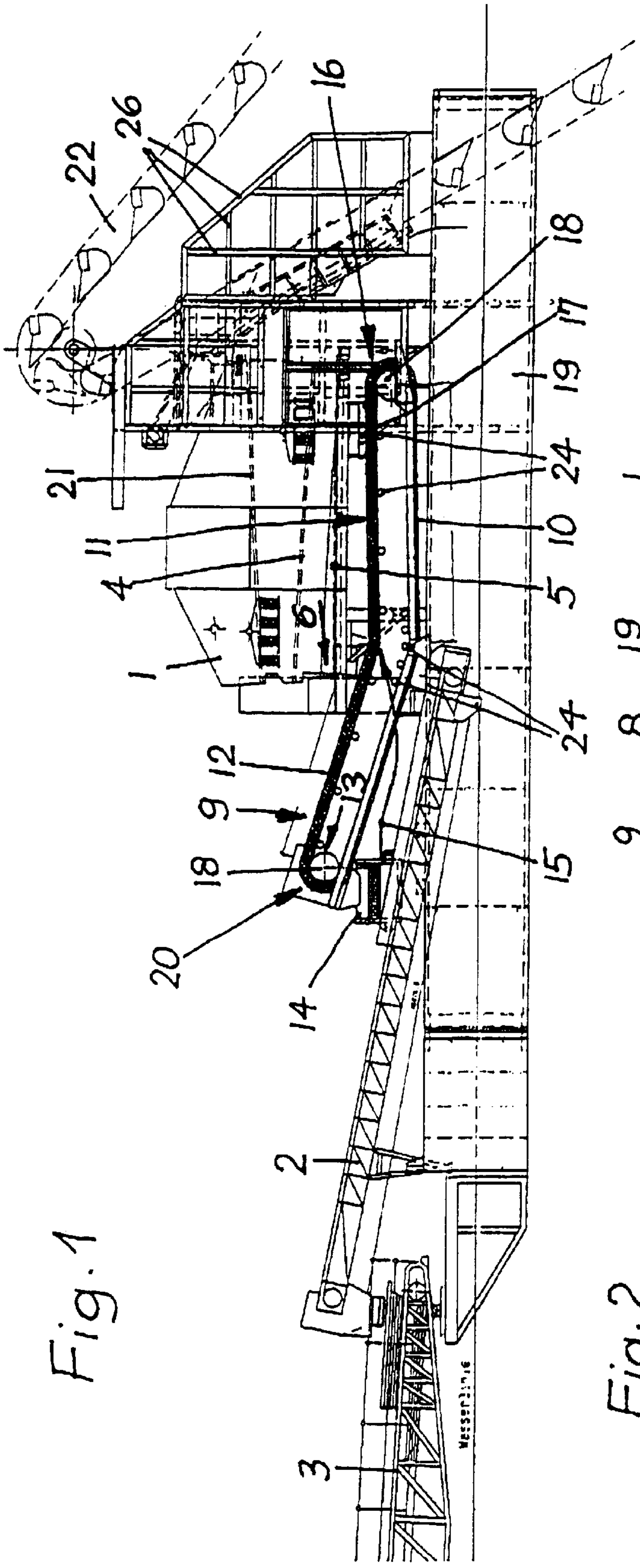
FIG. 1 shows a first embodiment of the device representing an elevation with a bucket chain dredger as the dredging equipment.
Figure 2:
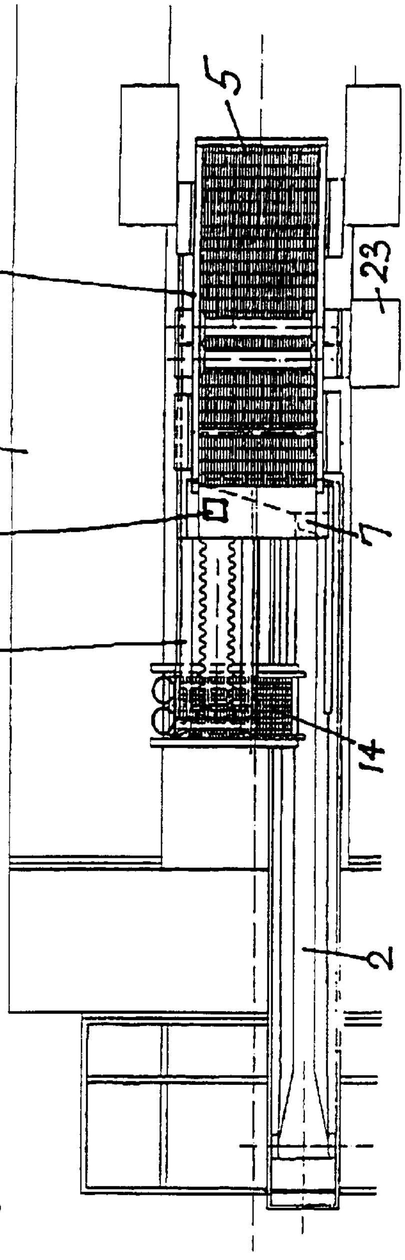
FIG. 2 is a top view of FIG. 1.

FIGS. 1 and 2 show a bucket chain excavator or dredger 22 that is arranged on a trestle structure 26 and located on a floating body 19. A horizontal screening machine 1 with a first top deck 21 and a dewatering deck 4 is arranged below this top deck and is arranged below the drop zone of the bucket chain dredger 22. This dewatering deck 4 has a dewatering coating. A blind bottom or catch basin 5 extending over the entire width and length of the screening machine 1, is located below the dewatering deck 4. As shown in FIG. 2, the screening machine 1 has a motor 23, for conveying the material in the conveying direction 6, with this material draining from the dewatering deck 4. A discharge opening 8 is located at the front end of the blind bottom 5. Small chutes are arranged on both sides of discharge opening 8.

A hydro belt separator 9 is located below blind bottom 5 of the screening machine 1. This type device is known for washing out and sorting organic, clay-like and other impurities from continuously fed coarse and fine granular solid materials and is described in DE 38 39 666 C1 incorporated herein by reference. In addition, this device is modified to the extent that there is an endless conveyor belt 10 that runs via two reversing rollers 18, so that the belt is supported on various support rollers 24. The top side of the conveyor belt is arranged so that starting from the center to the right, a washing trough 11 is formed as the separation bed. This separation bed has an overflow 16 for the finest material, and an ascending part 12 that extends in the opposite direction with a fine sand discharge 20 located at the end. In this case, the conveyor belt 10 is driven in the direction of arrow 13.

Via the fine sand discharge 20, the material is transported either via a dewatering screen 14 or directly onto a material conveyor 2, and subsequently onto a floating conveyor belt 3. When using this additional dewatering screen 14, it is connected via a return line 15 with the separation bed 11 of the hydro belt separator 9.

The installed blind bottom 5 causes the water and fine sand mixture to be collected, and the mixture is then transported to the discharge 8 via blind bottom 5. The drive of screening machine 1 is used in this connection for transporting the material to hydro belt separator 9.

Thus, it is possible to maintain a low structural height, and when the sand-and-water mixture is collected at a high level, it permits the installation of a drying and dewatering device downstream. The weight should be kept low in the superstructure so that these structures can also be adapted to the listing (or roll) of the float. The hydro belt separator 9 classifies the water-and-sand mixture with sharp separation. Components that can be washed off drain back into the lake (or sea) via the overflow 16. The usable fine sand is discharged to the front and transferred to the conveyor belt 2 transporting it away, or, if fine sand is collected in greater amounts, transported off via the dewatering screen 14.

This embodiment can be modified in minor ways. For example, it can be modified by designing the dewatering deck 4 as a classifying deck, so that the equipment can be used for treating the sand. Furthermore, a ball filter 17 of this type is described in German Patent Application 197 38 674.1 and can be arranged within the zone of the separation bed 11.

Figure 3:
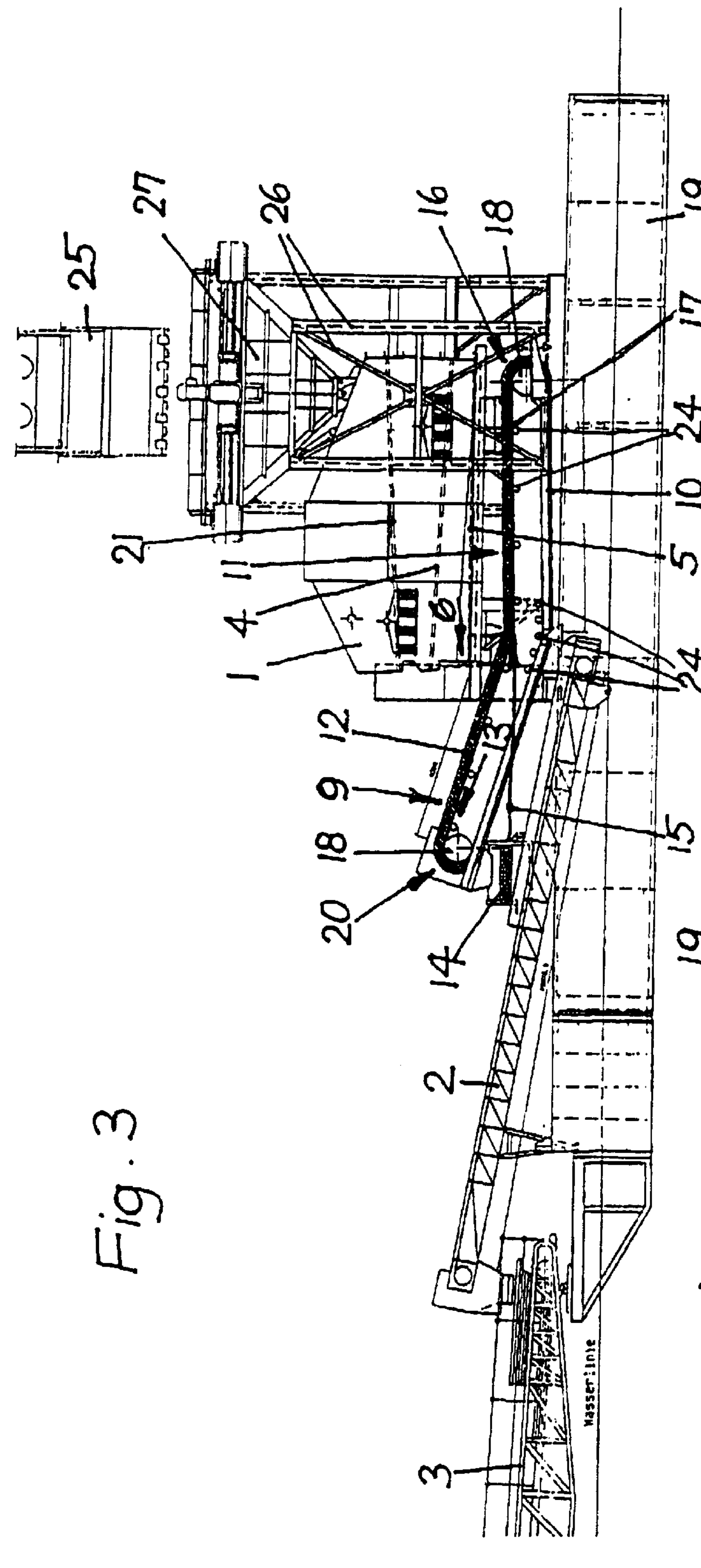
FIG. 3 shows a second embodiment of the device representing an elevation with a floating grab-bucket excavator as the dredging equipment.
Figure 4:
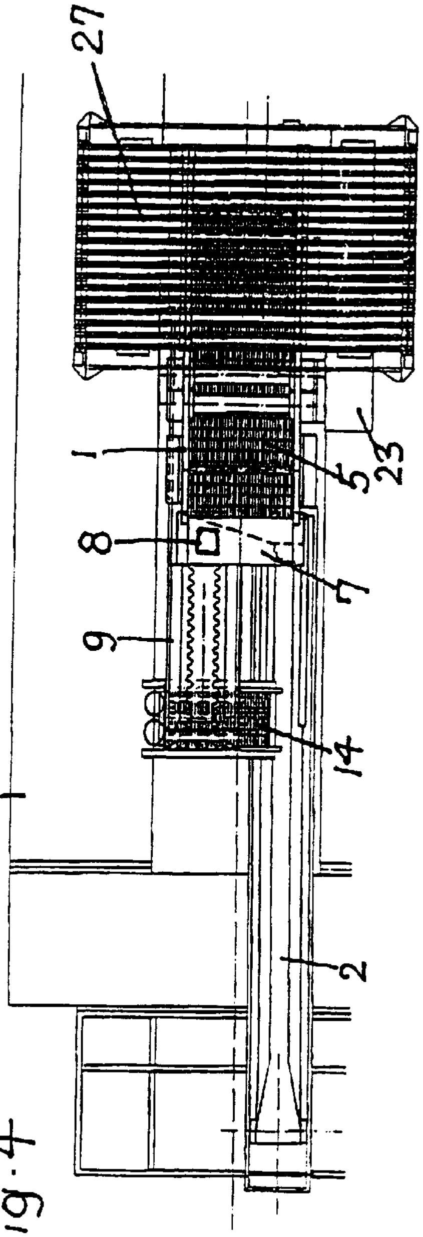
FIG. 4 is a top view of FIG. 2.

The second embodiment of floating plant as shown in FIGS. 3 and 4 differs from the embodiment according to FIGS. 1 and 2 in that there is the arrangement of a floating grab-bucket excavator 25 that is used as the production equipment. In this case, there is a funnel 27 arranged between the grab-bucket excavator 25 and the screening machine 1.

Accordingly, while two embodiments of the present invention have been shown and described, it is to be understood that many changes and modifications may be made thereunto without departing from the spirit and scope of the invention as defined in the appended claims.

What is claimed is:

1. A method for recovering fine sand from a dredged material using floating production equipment in the form of a floating grab-bucket excavator or floating bucket chain dredger, comprising the steps of:

a) dewatering the dredged material in a screening machine;

b) transporting the dredged material to shore in a conveying direction via floating conveyor belts, wherein a blind bottom is installed below a dewatering screen of the screening machine, said blind bottom collecting a water and fine sand mixture, c) discharging the water and fine sand mixture in the conveying direction; and d) charging the water and fine sand mixture in a washing trough said trough serving as the separation bed of a hydro belt separator.

2. A device for recovering fine sand from floating production equipment, comprising:

a) a dewatering screening machine having:

i) a dewatering deck having a dewatering coating, disposed within said dewatering screening machine;

ii) a blind bottom, disposed below said dewatering deck, inside said dewatering screening machine covering an entire area of said dewatering deck, and also having a discharge opening disposed in an end zone of said blind bottom for dispensing material;

b) a hydro belt separator for receiving a discharge of material from said blind bottom, said hydro belt separator comprising an endless revolving conveyor belt for conveying the discharge, said conveyor belt having a washing trough section for receiving the discharge and functioning as a separation bed, and an ascending part section leading away from said washing trough section, wherein the dredged material is transferred through a discharge opening of said hydro-belt separator disposed adjacent to said ascending part section;

c) a material conveyor disposed below said hydro belt separator wherein the dredged material falls off of said conveyor belt through said hydro belt separator discharge opening and onto said material conveyor; and d) a floating conveyor belt, arranged downstream of said material conveyor, for receiving material from said material conveyor which is conveying material from said hydro belt separator.

3. The device as claimed in claim 2, further comprising a funnel disposed above said dewatering screening machine, said funnel for receiving material from a floating grab bucket excavator.

4. The device as claimed in claim 3, wherein said dewatering screening machine is fed material from a bucket chain dredger disposed above said dewatering screening machine.

* * * * *